May 26, 1964
W. OPITZ ETAL
METHOD AND APPARATUS FOR THE MACHINING OF MATERIAL
BY MEANS OF A BEAM OF CHARGE CARRIERS
Filed Aug. 1, 1961
3,134,892
4 Sheets-Sheet 1
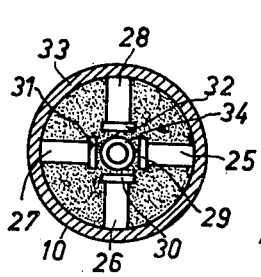
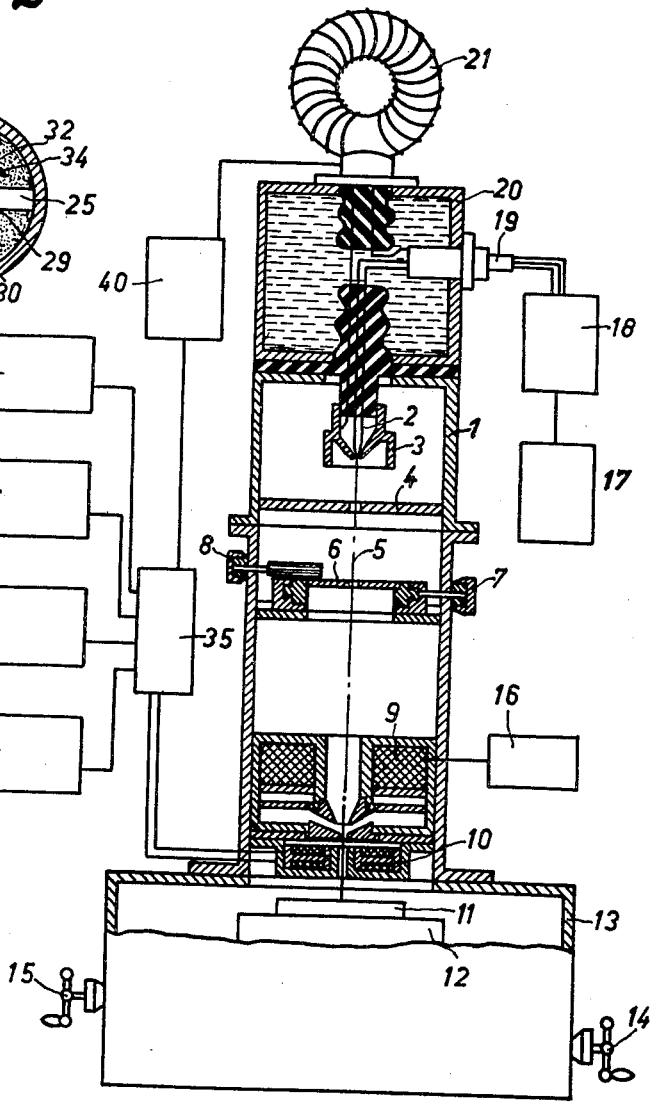
INVENTOR.
WOLFGANG OPITZ
FRITZ SCHLEICH
BY

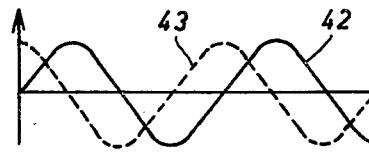
Fig. 3a  Fig. 3b
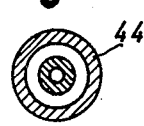
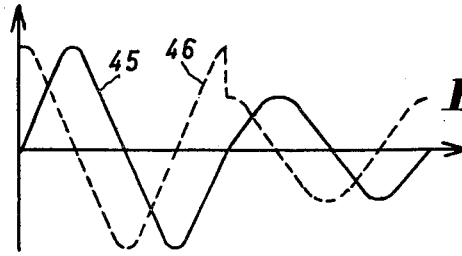
Fig. 4a  Fig. 4b
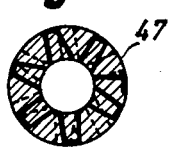
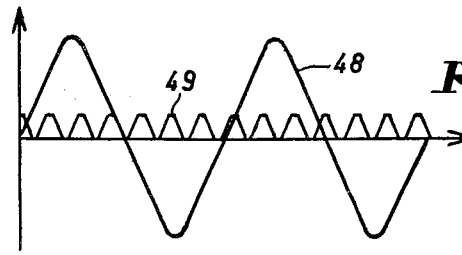
Fig. 5a  Fig. 5b
Fig. 6a
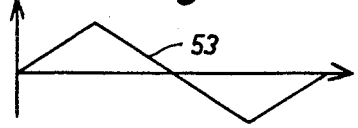
Fig. 6d  Fig. 6b
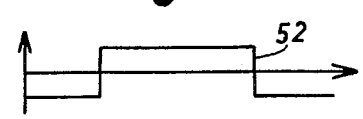
Fig. 6e  Fig. 6c May 26, 1964  W. OPITZ ETAL  3,134,892
METHOD AND APPARATUS FOR THE MACHINING OF MATERIAL
BY MEANS OF A BEAM OF CHARGE CARRIERS
Filed Aug. 1, 1961  4 Sheets-Sheet 3

INVENTOR.
WOLFGANG OPITZ
FRITZ SCHLEICH
BY

May 26, 1964  W. OPITZ ETAL  3,134,892
METHOD AND APPARATUS FOR THE MACHINING OF MATERIAL
BY MEANS OF A BEAM OF CHARGE CARRIERS
Filed Aug. 1, 1961  4 Sheets-Sheet 4

INVENTOR.
WOLFGANG OPITZ
FRITZ SCHLEICH
BY

United States Patent Office 3,134,892
Patented May 26, 1964

3,134,892
METHOD AND APPARATUS FOR THE MACHINING OF MATERIAL BY MEANS OF A BEAM OF CHARGE CARRIERS
Wolfgang Opitz, Aalen, Wurttemberg, and Fritz Schleich, Unterkochen, Wurttemberg, Germany, assignors, by mesne assignments, to United Aircraft Corporation, East Hartford, Conn., a corporation of Delaware
Filed Aug. 1, 1961, Ser. No. 128,455
22 Claims. (Cl. 219—69)

This invention relates to machining of materials and, more particularly, relates to an improved method and means for the machining of material by means of a beam of charged particles.

In the machining of material by beams of charge carriers, for example in the production of boreholes or form cuttings, the point of the material which is to be machined is heated to a high temperature by bombardment with charge carriers so that the material evaporates at this point.

In order to obtain a speed of evaporation which can be employed for practical purposes, i.e. in the case described a sufficient speed of drilling, the beam of charge carriers must have a sufficiently high energy density at the point of impingement on the material. Normally, for this purpose the beam of charge carriers is so focussed that it gives off its energy uniformly over the entire surface being machined. The intensity distribution over the work cross section should, in this connection, as far as possible be square, i.e. the intensity should drop at the limits of the worked area rapidly from the high value necessary for the machining to a value of zero.

It is already known to burn holes of desired shape into extremely thin sheets by means of a moving beam of charge carriers. It is also known, by means of a suitably focussed beam of charge carriers, to drill in relatively thick material, holes the shape of which corresponds essentially to the shape of charge carriers. With increasing size of the surface being worked, there results with this known machine process a larger and larger heat-stressed zone of material around the region of the material being worked. This means that undesirably large layers are melted at the edge and below the region worked. In this way the losses are increased and the desired effect is disturbed.

A material machining process is also known in which an intermittently active beam of charge carriers, the operating cross section of which is smaller than the surface of the region of the material to be worked passes over said region. In this method, the beam of charge carriers is moved in predetermined manner intermittently over the working region in such a manner that surface elements which are worked directly after one another are separated by a distance which is greater than the diameter of such a surface element and over which the beam is disconnected or acts only very slightly on the material. The entire working region is finally composed completely of a plurality of worked surface elements adjoining each other.

This method of working disclosed in U.S. Patent No. 2,989,614 assigned to the assignee of the present invention has many advantages.

The object of the present invention is to provide an improved method of working material by means of a beam of charge carriers which makes possible a rapid working of work pieces which is adapted to the thermodynamic conditions of said method of working, and in particular the production of profile cuttings and which requires, for the carrying out thereof, an apparatus which can be set up at relatively little expense.

Profile form cuttings are made, for instance, in injection nozzles, spinnerettes, filters, nozzles for the feeding of cooling liquids, etc.

The method in accordance with the invention for the production of form cuttings by means of a beam of charge carriers employs a beam the working cross section of which is smaller than the surface of the region of the material to be worked and which, deflectable by electron-optical means, passes over said region of material and is characterized by the fact that the beam of charge carriers is always so guided over the material within the limits of the region of the material to be worked that the energy concentration is highest along the edge lines of this region and that an energy sufficient for the evaporation of the material is fed to each point of said region.

By the concentration of the energy at the edges of the working region, the very high loss of heat which occurs there is compensated for so that therefore the production of a dependable definition of the working region is made possible. The said high heat loss at the edges of the working region occurs as a result of the very large lateral temperature gradient here, with the result that a substantial part of the energy which is radiated into same is lost by heat conduction.

In the method for the working of material in accordance with the present invention, the beam of charge carriers is guided in such a manner that it removes the material in layers within the limits of the working region. In this way, the result is obtained that during the removal of the material no large steps are produced within the working region. Such steps would result in a substantial disturbance of the working process.

It is particularly advantageous to cause the beam of charge carriers to act intermittently. In such case, the control is selected in such a manner that successive beam pulses are caused to act at points which are as far apart from each other as possible, the points of impingement of the beam pulses being staggered with respect to each other during successive scanning cycles. This result may suitably be obtained in the manner that synchronization between pulse repetition frequency and deflection frequency is avoided so that, therefore, the beam of charge carriers does not strike again at the same points when moved several times over the work region. In this way, the material within the work region is removed uniformly in layers, despite the discontinuous action of the intermittent beam of charge carriers over the profile surface.

In order to see to it that the pulse repetition frequency is not an integral multiple of the deflection frequency, it is advantageous to produce the deflection frequency by frequency modulation of the pulse repetition frequency with an auxiliary frequency which is low as compared therewith.

In the new method the beam of charge carriers can be so controlled in a relatively simple manner that it cuts a plurality of simple basic profiles out of the workpiece. The deflection currents necessary for this are, for example, of sinusoidal, trapezoidal, serrated or square waveform and can, accordingly, be produced in generators of simple construction.

Further details as to the nature of the control of the beam of charge carriers will be given when discussing the accompanying drawings.

By means of the new method, it is possible in particular to produce round and oval as well as rectangular and elongated basic profiles having parallel or non-parallel edges in a simple manner.

These basic profiles can be combined into larger overall profiles of axial symmetry, this combining being effected electronically by means of a switching matrix of relatively simple construction. This switch matrix is so set that the beam of charge carriers is guided for instance in one direction from the center of the entire profile successively over the partial surfaces corresponding to the basic profiles and in this connection in each case removes a layer of each partial surface.

By means of the new method, it is also possible to produce overall profiles which are composed of partial surfaces aligned in pairs parallel to each other. For this purpose, the beam of charge carriers is deflected by means of a direct current flowing through the deflection elements in question up to the center line of the partial surface to be worked in each instance.

The overall profiles to be produced by the new method can be composed of partial surfaces which, calculated from the center of the overall profile, have only half the length of the aforementioned basic profiles. The beam of charge carriers is in this case so deflected after passing over the half of a basic profile corresponding to a partial surface that the other half of this basic profile is passed over at a point of the overall profile which corresponds with another partial surface. If an overall profile consisting of larger partial surfaces is required, it is advantageous to select the partial surfaces in accordance with the aforementioned basic profiles and to pre-deflect the beam of charge carriers by means of a direct current flowing through the corresponding deflection elements. In this case, therefore, an overall profile the outside dimensions of which are larger than those of the basic profile are produced without an increase in the deflection currents necessary to produce the basic profiles.

In order to produce an overall profile composed of intersecting or contacting partial surfaces, the beam of charge carriers is advisedly conducted in such a manner that an energy accumulation occurs both along the edge lines of the profile and in the outer part of each partial surface facing away from the point of intersection. In this way, the increased removal of heat in the outer parts of the profile as compared with the center of the profile is compensated for so that, therefore, the outer profile parts are also cut out precisely along the prescribed edge lines.

The purpose of producing an accumulation of energy in the outer part of each partial surface facing away from the point of intersection can also be achieved by controlling the energy of the beam of charge carriers in predetermined manner synchronously with the linear deflection of the beam. With intermittent control of the beam of charge carriers, it is advantageous to control the pulse amplitude, the pulse duration and the pulse repetition frequency.

The apparatus in accordance with the present invention consists of a known apparatus for the working of material by means of a beam of charge carriers which, however, contains, in addition, a deflection system designed in accordance with the axial symmetry of the figure to be produced and switch means connected with same for producing and feeding the deflection currents in accordance with a pre-established program. These switch means advisedly consist of at least two generators supplying deflection currents of different shape as a function of time, as well as a switching arrangement connected with said generators and serving for feeding deflection currents to the coils of the deflection system. This switching arrangement itself advantageously consists of a plurality of mechanical or electronic switches, for instance relays or switch transistors which are actuated in periodic sequence in groups one after the other. A counting relay known from the telecommunications art or an electronic ring counter which with each step actuates a group of mechanical electronic switches, is preferably used. It is also possible to construct the said switch arrangement solely by the use of transistors.

In the apparatus in accordance with the present invention, the generators supply the deflection currents necessary to produce the basic profiles, while the basic profiles are combined in predetermined manner to form an overall profile by means of the said switch arrangement. The entire program for producing a composite profile is therefore contained in the said switch arrangement.

The switch arrangement is advisedly so developed and set that each time after passing over a partial surface and possibly with simultaneous reversal of polarity of the deflection coils, the role of the deflection coil serving for the transverse and longitudinal deflection are interchanged. In this way, the result is obtained that the partial surfaces of a composite profile are worked one after the other on the one side starting from the center of the overall profile.

It is advisable to connect the switching arrangement serving for the switching of the deflection coils with the control pulse generator in such a manner that the control pulses are suppressed for a predetermined period of time during each switching process. In this way, one definitely avoids beam pulses falling outside the working point proper as a result of transient processes.

It may also be advantageous to connect the switch arrangement serving for the switching with the control pulse generator in such a manner that the control pulses are suppressed during the retrace. In this way, the beam of charge carriers is prevented from impinging on regions of the working place of the material outside of the desired area as a result of the magnetic properties of the deflection systems.

The invention will be explained in further detail below with reference to FIGS. 1 to 14 showing embodiments of the invention.

FIG. 1 is a sectioned elevation view of a device constructed in accordance with the invention for making profile cuttings by means of a beam of charge carriers;

FIG. 2 is a top plan view of the deflection system contained in the device in accordance with FIG. 1;

FIGS. 3 to 8 are plan views showing different basic profiles and plots of the deflection currents necessary to control the corresponding deflection of the beam of charge carriers;

Figure 7A:
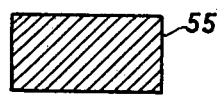

In FIG. 1 there is shown an electron beam milling machine comprising an evacuated casing 1 in which there is arranged a beam generating system consisting of the cathode 2, the control electrode 3 and the anode 4. For the further shaping of the electron beam 5, there is provided an aperture 6 which can be positioned by means of the adjustment knobs 7 and 8 and conventional linkages to move the aperture along respective coordinate axes. An electromagnetic lens 9, the current supply of which is designated 16, serves to focus the electron beam onto the workpiece 11 which is to be worked. The workpiece 11, for example a spinnerette, is arranged in a chamber 13, which is also under vacuum, on a table 12 which can be displaced from left to right or vice versa by means of a spindle 15. Another spindle 14 serves to displace the workpiece perpendicular to the plane of the paper.

Between the electromagnetic lens 9 and the workpiece 11, there is arranged an electromagnetic deflecting system 10 which serves to deflect the electron beam 5 in the plane of the paper and at right angles to the plane of the paper. The deflection system 10, as can be noted from FIG. 2, consists of four electromagnetic coils 25 to 28, staggered 90° apart, and equipped with a ferromagnetic core 29 to 32 respectively. A ferromagnetic ring 33 serves as return path for the magnetic field which is produced in the tube 34 serving for the passage of the beam. All coils of the deflection system are embedded in synthetic resin. The deflection system is so developed that the electron beam 5 describes a distortion-free raster on the surface of the workpiece 11 when the corresponding deflection currents are fed.

Generator 17 produces a unidirectional high voltage of, for example, 100 kv. which is fed by means of a high voltage cable provided with grounded jacket to the adjustable bias source 18. The bias source generates the adjustable heater voltage and the adjustable control electrode bias voltage which voltages are superimposed on the high acceleration voltages generated by generator 17. These voltages are introduced into the oil filled container 20 by a 3-wire high voltage cable 19 provided with a grounded jacket. The heater voltage which is, for example, −100 kv. is fed directly to the cathode 2. The control electrode voltage of, for example, −101 kv. is fed through the insulator extension to the secondary winding of the high voltage isolating transformer 21 and passes from there directly to the control electrode 3. The control electrode bias voltage is so adjusted with respect to the cathode bias that in quiescent state the beam generating system is blocked (i.e. the beam is cut off). The relative voltage between the cathode 2 and the grounded anode 4 provides the acceleration field for the beam.

A controllable switching matrix 35 is provided to selectably couple the deflection system 10 to generators 36 to 39 which serve to produce the deflection currents of different wave shapes. For example, the generator 36 produces a deflection current of saw-tooth waveform, the generator 37 a deflection current of sinusoidal waveform, generator 38 a deflection current of square waveform, and generator 39 a direct current of adjustable amplitude.

With the isolating pulse transformer 21, there is connected a control pulse generator 40 which also is connected with the switch matrix 35. The control pulse generator 40 supplies positive control pulses which decrease the bias voltage of the beam generating system to such an extent that for the duration of a control pulse, the beam generating system is unlocked and an electron beam pulse is produced. Via the switch arrangement 35, the control pulses supplied by the control pulse generator 40 are suppressed during the return of the deflection voltage and/or upon the production of composite profiles during given switching times.

In order to work the material along desired profiles, the respective deflection currents are combined and applied to the deflection system to provide simple and efficient control. Specific profiles of basic and composite nature are illustrated and described in the following portions of the specification.

FIG. 3a shows a round base profile 41, the diameter of which is only slightly greater than the active beam diameter of the electron beam 5. By means of the deflection currents 42 and 43, 90° out of phase with each other, supplied by the generator 38 to the coil sets 25, 27 and 26, 28 (FIG. 2) respectively, the beam of charge carriers is so guided along the outer edge line of the profile 41 that the outer edge of the effective beam cross section contacts the limiting line of the profile. In this connection, the material lying in the center which is not struck by the beam is heated to a sufficiently high temperature to be also removed.

FIG. 4a shows a round base profile 44, the diameter of which is 4 to 6 times as great as the effective diameter of the electron beam 5. In order to produce this profile, the electron beam 5 is guided by means of the deflection currents 45 and 46 alternately in time in such a manner on two concentric circular lines that the outer edge of the active beam cross section contacts the outer limiting line of the profile and that the material lying between the circular lines and the material lying within the inner circular line is also removed.

FIG. 5a shows a round basic profile 47 of larger diameter. For the production of it, the electron beam 5 is moved in such a manner over the hatched annular surface located at the outer edge of the profile that the outer edge of the effective beam cross section contacts the outer limiting line of the profile and that an accumulation of energy occurs along the two limiting lines. For this purpose, the sinusoidal deflection currents which are 90° out of phase with each other—of which only the deflection current 48 is shown in FIG. 5—are modulated by means of the trapezoidal current 49. The frequency of the deflection current 49 is in this connection substantially greater than the frequency of the deflection current 48, synchronization between these two deflection currents being avoided by suitable frequency selection. As can be noted directly from FIG. 5a, the electron beam in this case is guided in raster-like manner over the hatched annular surface, in which connection successive rasters are displaced with respect to each other. By the trapezoidal modulation voltage 49, the result is obtained that the electron beam is moved more slowly along the edge lines of the circular ring than at right angles to said circular lines. In this way an accumulation of the energy is obtained along the edge lines.

The same effect can be obtained if the deflection currents are sinusoidally amplitude-modulated rather than being trapezoidally modulated.

In order to produce oval basic profiles, it is necessary to make the amplitudes of the deflection currents which are 90° out of phase shown in FIGS. 3b, 4b and 5b of different value.

FIG. 6a shows an elongated rectangular basic profile 50, the width of which is only slightly greater than the effective beam diameter. The deflection current 51 serving for the longitudinal deflection of the electron beam 5 has the saw-tooth course as a function of time shown in FIG. 6b. By means of this deflection current, the beam of charge carriers is conducted with constant velocity in the longitudinal direction of the profile. For the transverse deflection of the beam of charge carriers, there is used a square deflection current 52, such as shown in FIG. 6c. As can be noted from FIGS. 6b and 6c, the deflection currents 51 and 52 are synchronized with each other. This synchronization is so selected that the electron beam is guided alternately in time over the two hatch strips. With this movement of the beam, the outer edge of the effective beam cross section contacts the outer limiting line of the profile.

Instead of the saw-tooth deflection current shown in FIG. 6b, the longitudinal deflection of the electron beam can also be effected by means of a triangular-shaped deflection current 53 shown in FIG. 6d. The transverse deflection is effected in this case by means of the square deflection current 54 shown in FIG. 6e. The triangular-shaped deflection current 53 causes the electron beam to be passed back and forth at constant velocity along the hatched lines of the profile 50. With such deflection, the beam of charge carriers changes each time after passing over one line to the other line.

FIG. 7a shows a rectangular basic profile 55 of large width. For its manufacture, the electron beam passes over the entire surface of the rectangle, its longitudinal deflection being effected by the saw-tooth deflection current 56 shown in FIG. 7b and its transverse deflection by the sinusoidal deflection current 57 shown in FIG. 7c. The deflection currents 56 and 57 are not synchronized with each other so that the electron beam does not describe a stationary raster on the profile 55. As can be readily noted, due to the sinusoidal transverse deflection current 57, the electron beam is moved more slowly at the edges of the profile than over the profile surface so that an accumulation of energy is produced at the profile edges.

Figure 7B:
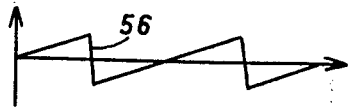
Figure 7C:
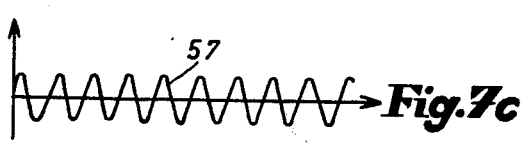
Figure 7D:
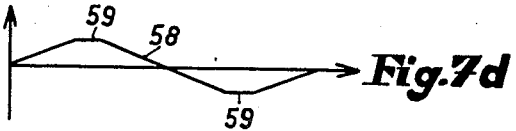

Instead of the sinusoidal deflection current 56 shown in FIG. 7b, there can be used for the longitudinal deflection of the electron beam over the profile 55 also the deflection current 58 shown in FIG. 7d, which has a triangular-shaped course with flattened peaks.

During the region 59 of the deflection current, the electron beam is not deflected in longitudinal direction, while the transverse deflection current is fully active. In this way, there is obtained an accumulation of energy also at the edge lines limiting the profile 55 in transverse direction.

Figure 8A:
Figure 8B:

FIG. 8a shows an elongated profile 60 with non-parallel edges. For its manufacture, the electron beam is guided by means of the substantially sinusoidal deflection current 61 shown in FIG. 8b in longitudinal direction with a speed inversely proportional to the width of the profile. The transverse deflection of the electron beam is effected by the deflection current 63 which is amplitude-modulated synchronously to the longitudinal deflection and the modulation voltage of which is designated 62. By this amplitude-modulation of the transverse deflecting current, the desired profile shape is obtained. The transverse deflecting current 63 is of sinusoidal course, so that an accumulation of energy occurs at the edges of the profile 60.

All of the basic profiles shown in FIGS. 3 to 8 are advisedly made with an intermittently controlled beam of charge carriers. The pulse repetition frequency is, in this case, not an integral multiple of the deflection frequency.

Figure 9A:
FIG. 9a is a plan view of a basic profile produced by means of an intermittently controlled beam of charge carriers and FIGS. 9b, c and d are plots of the currents necessary for the control of the beam and its deflection.
Figure 9B:
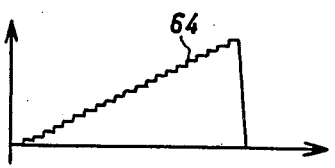
Figure 9C:
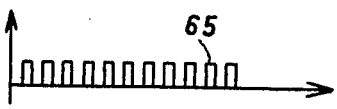
Figure 9D:

FIG. 9a shows a rectangular elongated basic profile 50 for the production of which, however, there is used an intermittently guided beam of charge carriers synchronized with the deflection currents. The deflection current 64 serving for the longitudinal deflection of the beam of charge carriers has a step-like course and is shown in FIG. 9b. The transverse deflection current 65 which is also synchronized to the deflection current 64 is shown in FIG. 9c. The synchronization is so selected that the electron beam, after each step, is guided from one edge line of the profile 50 to the other. The modulation of the beam intensity is so selected that one beam pulse 66 corresponds to each step of the longitudinal deflection current 64.

If the synchronization of the deflecting currents is so selected that during the return of the longitudinal deflection current, the transverse deflection current is shifted in phase by half a cycle, the electron beam describes on the profile 50 two interlaced rasters, one of which is shown in FIG. 9a. The distance between two points of the interlaced rasters is, in this connection, advisedly smaller than the effective beam diameter. If the steps of the longitudinal deflection current are selected in advance in such a manner that beam pulses which succeed each other in a line are a distance apart which is less than the effective beam diameter, the entire profile 50 can be described by means of a single raster.

From the basic profiles shown in FIGS. 3 to 8, composite profiles are recorded by corresponding programming of the switching matrix 35 shown in FIG. 1. Such a profile is shown by way of example in FIG. 10.

Figure 10A:
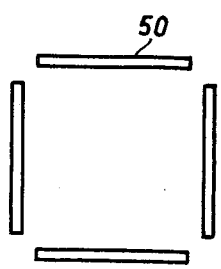
FIGS. 10a and 11a are plan views of the profiles composed of basic profiles and FIGS. 10b, c and 11b, c are plots of the respective deflection currents necessary to produce these profiles.
Figure 10B:
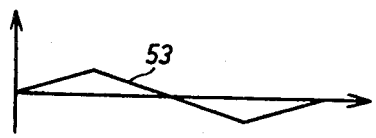
Figure 10C:
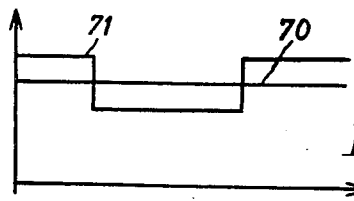

FIG. 10a shows a composite profile consisting of four basic profiles 50 arranged alternately parallel to each other. For its production, the electron beam 5 is conducted in longitudinal direction by means of the longitudinal deflection current 53 shown in FIG. 10b. At the same time the electron beam is so deflected in transverse direction by means of a direct current 70 supplied by the generator 39 that the transverse deflection current 71 shown in FIG. 10c is produced. As soon as the electron beam has traveled over the two edge lines of the upper base profile 50, the function of the longitudinal and transverse deflection coils is interchanged by means of the switch arrangement 35 so that the electron beam 5 in the next cycle moves over the two edge lines of the left-hand base profile. After a corresponding number of switches, the electron beam 5 has finally cut the overall profile shown in FIG. 10a out of the workpiece 11.

Figure 11A:
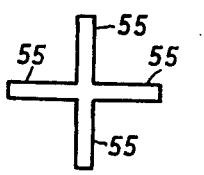

FIG. 11a shows a cross profile which, as can readily be noted, can be composed of the basic profiles 55 of corresponding partial surfaces. For its production, there is used a longitudinal deflection current 72 which has the waveform shown in FIG. 11b. As can be noted from this figure, the longitudinal deflection current 52 has a substantially saw-tooth course, the peaks of the saw-tooth being however flattened. By this flattening the result is obtained that the beam of charge carriers stays for a longer time at the outer end of each partial surface than at the end near the point of intersection. For this reason, therefore, the electron beam is moved by means of the transverse deflection current 73 (FIG. 11c) more frequently in transverse direction at the outer end of each partial surface than at the other end of the partial surface so that an accumulation of energy occurs in the outer parts of the arms of the cross.

If the coils of the deflection system which are serving at the time for the longitudinal deflection are fed a direct current which effects a pre-deflection of the electron beam 5 by half the length of the base of profile, there can, in this case, be produced a cross-shaped profile, the arms of which have the full length of the basic profile. The alternating current serving for the longitudinal deflection must, in this connection, not be increased as compared with the longitudinal deflection current serving to produce the basic profile.

Figure 8C:
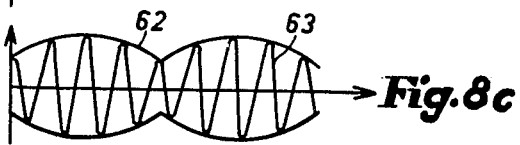
Figure 12:
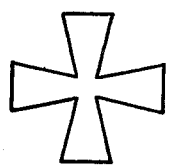
FIGS. 12 and 13 are plan views of composite profiles.

In FIG. 12 there is shown a profile consisting of two crossed basic profiles 60. For its production, the longitudinal deflection current 61, FIG. 8 is first of all fed to the deflection coils 25 and 27, while the transverse deflection current 63 is fed to the coils 26 and 28. As soon as the electron beam has described half of the basic profile 60, the role of the longitudinal and transverse deflection coils is interchanged by means of the switching matrix 35. For this reason, the next half of the basic profile is worked in a position 90° away. By continuous switching by means of the relay arrangement 35, the composite profile shown in FIG. 12 is finally cut out of the workpiece 11.

Figure 13:
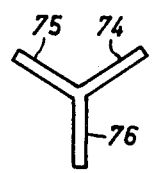
Figure 14:
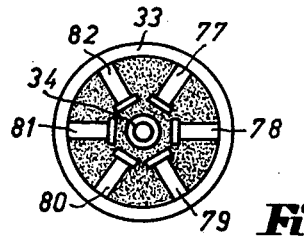
FIG. 14 is a top view of a beam deflection system used to produce the profile shown in FIG. 13.

FIG. 13 shows a profile consisting of the three arms 74, 75 and 76, the individual arms of which correspond to the basic profile 50. In order to produce this profile, there is used, instead of the double-deflection system designated by 10 in FIG. 1, the triple-deflection system shown in top view in FIG. 14. This deflection system consists of the six deflection coils 77 to 82.

Figure 11B:
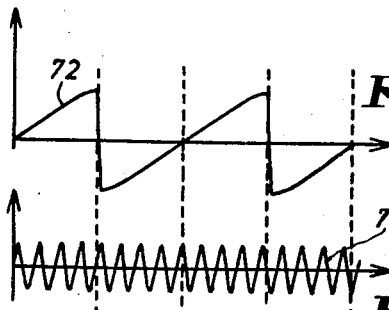
Figure 11C:
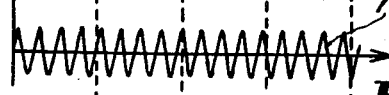

When producing the profile shown in FIG. 13, the coils 77, 78 and 80 and 81 are first of all, for example, fed the deflection current 72 shown in FIG. 11b, while the deflection coils 79 and 82 are fed the transverse deflection current 52 shown in FIG. 6c. After the electron beam 5 has moved over an edge line of the partial surface 74 starting from the center of the profile, the switching matrix 35 switches, with simultaneous reversal of polarity of the deflection coils, in such a manner that now the coils 78, 79, 81 and 82 serve for the longitudinal deflection and the coils 77 and 80 for the transverse deflection. In this way an edge line of the partial surface 75 is traveled over by the electron beam. Thereupon the switching arrangement 35 again switches with simultaneous reversal of polarity so that now the deflection coils 79, 80, 82 and 77 serve for the longitudinal deflection and the coils 78 and 81 for the transverse deflection. In this connection the electron beam travels over an edge line of the partial surface 76. In this way, the arms 74, 75 and 76 are removed one after the other until the complete profile has been cut out of the workpiece 11. The longitudinal deflection of the electron beam is effected always to one side starting from the center of the profile.

The composite profiles shown in FIGS. 10 to 13 are also produced advisedly by means of an intermittently controlled beam of charge carriers. In this connection, it is possible, for example in the case of the production of the composite profile shown in FIG. 11, so to regulate the impulse amplitude, the impulse duration or the impulse repetition frequency that even when using a saw-tooth deflection current with non-flattened peaks, an energy accumulation occurs in the outer regions of the basic profiles.

This invention may be variously modified and embodied within the scope of the subjoined claims.

What is claimed is:

1. The method of producing profile millings by means of a beam of charge carriers, the working cross section of which is smaller than the surface of the region of material to be worked, which comprises focussing the beam on the surface to be worked with an intensity sufficiently high to vaporize the material, pulsing the beam intermittently, and continuously deflecting the beam in repeated passes over the surface within the limits of the region of the material to be worked in such a manner that the energy concentration is highest along the edge lines of the region, that an amount of energy sufficient for vaporization of the material is directed at each point of said region, and that the points of impingement of the beam pulses are displaced with respect to the points of impingement during the preceding pass.

2. The method according to claim 1 in which the beam pulses occurring one after the other in time are so deflected to act at points lying as far as possible apart, the points of impingement of the beam pulses being displaced with respect to each other during successive scanning processes.

3. The method according to claim 2 in which the pulse repetition frequency is not an integral multiple of the deflection frequency.

4. The method according to claim 3 in which the deflection frequency is obtained by frequency modulation of the pulse repetition frequency with an auxiliary frequency which is low in proportion thereto.

5. The method according to claim 1 in which the beam of charge carriers is guided in accordance with a fixed raster over the region of material to be worked, the longitudinal deflection being effected by a step-shaped deflection magnitude synchronized with the pulse repetition frequency so that a beam pulse impinges on each step and in which the transverse deflection is also synchronized with the pulse repetition frequency.

6. The method according to claim 21 in which the beam of charge carriers, in order to produce a profile composed of intersecting or contacting partial surfaces, is guided in such a manner that an accumulation of energy occurs both along the edge lines of the profile and in the outer part of each partial surface facing away from the point of intersection.

7. The method according to claim 6, in which the beam of charge carriers, in order to produce a cross-shaped profile, is deflected by means of a deflection current in the direction of the arms of the cross, the waveform of which current has the shape of a saw-tooth with flattened tips.

8. The method according to claim 21 in which the beam of charge carriers, in order to produce partial surfaces of a profile which are aligned parallel to each other, is deflected by means of a direct current flowing through the deflection elements in question up to the center line of the partial surface to be worked at the time.

9. The combination according to claim 22 in which said switching matrix is developed as a relay and/or transistor circuit.

10. The combinattion according to claim 22 which includes a D.C. generator coupled to the switching matrix.

11. The combination according to claim 22 in which the switching matrix includes means for interchanging the role of the deflection coils serving for the transverse and longitudinal deflection with simultaneous reversal of polarity of the deflecting coils.

12. The combination according to claim 22 which includes a control pulse generator to intermittently pulse the beam, said generator being coupled to said matrix in such manner that the control pulses are suppressed for a predetermined period of time during each switching process.

13. The combination in accordance with claim 12 which includes a bias voltage generator to supply the bias voltage of the beam generator and in which said bias voltage generator is coupled to said switching matrix.

14. The method of producing profile millings by means of a beam of charge carriers the working cross section of which is smaller than the surface of the region of material to be worked which comprises focussing the beam on the surface to be worked with an intensity sufficiently high to vaporize the material, and continuously deflecting the beam over the surface within the limits of the region of material to be worked in such a manner that the energy concentration is highest along the edge lines of said region and that an amount of energy sufficient for volatilization of the material is fed to each point of said region, in which the beam of charge carriers, in order to produce round or oval profiles the diameter of which is only slightly greater than the effective beam diameter, is so moved along the outer edge line of the working place that the outer edge of the effective beam cross section contacts the limiting line of the profile.

15. The method of producing profile millings by means of a beam of charge carriers the working cross section of which is smaller than the surface of the region of material to be worked which comprises focussing the beam on the surface to be worked with an intensity sufficiently high to vaporize the material, and continuously deflecting the beam over the surface within the limits of the region of material to be worked in such a manner that the energy concentration is highest along the edge lines of said region and that an amount of energy sufficient for volatilization of the material is fed to each point of said region, in which the beam of charge carriers, in order to produce round or oval profiles the diameter of which is four to six times as great as the effective beam diameter, is guided in time alternation in such a manner over two concentric circular lines that the outer edge of the effective beam cross section contacts the outer limiting line of the profile and that the material lying between the circular lines and the material lying within the inner circular line is also removed.

16. The method of producing profile millings by means of a beam of charge carriers the working cross section of which is smaller than the surface of the region of material to be worked which comprises focussing the beam on the surface to be worked with an intensity sufficiently high to vaporize the material, and continuously deflecting the beam over the surface within the limits of the region of material to be worked in such a manner that the energy concentration is highest along the edge lines of said region and that an amount of energy sufficient for volatilization of the material is fed to each point of said region, in which the beam of charge carriers, in order to produce round or oval profiles of larger diameter, is so moved over an annular surface located at the outer edge of the profile that the outer edge of the effective beam cross section contacts the outer limiting line of the profile and that an accumulation of energy occurs along the two limiting lines.

17. The method of producing profile millings by means of a beam of charge carriers the working cross section of which is smaller than the surface of the region of material to be worked which comprises focussing the beam on the surface to be worked with an intensity sufficiently high to vaporize the material, and continuously deflecting the beam over the surface within the limits of the region of material to be worked in such a manner that the energy concentration is highest along the edge lines of said region and that an amount of energy sufficient for volatilization of the material is fed to each point of said region, in which the beam of charge carriers, in order to produce rectangular profiles of a width which is little greater than the effective beam diameter, is guided with constant speed in time alternation along the two longitudinal limiting lines in such a manner that the outer edge of the effective beam cross section contacts the outer limiting lines of the profile.

18. The method of producing profile millings by means of a beam of charge carriers the working cross section of which is smaller than the surface of the region of material to be worked which comprises focussing the beam on the surface to be worked with an intensity sufficiently high to vaporize the material, and continuously deflecting the beam over the surface within the limits of the region of material to be worked in such a manner that the energy concentration is highest along the edge lines of said region and that an amount of energy sufficient for volatilization of the material is fed to each point of said region, in which the beam of charge carriers, in order to produce rectangular profiles of a larger width than four times the effective beam diameter, is guided in such a manner that it passes over the entire surface and that an accumulation of energy occurs along the edge lines of the profile.

19. The method of producing profile millings by means of a beam of charge carriers the working cross section of which is smaller than the surface of the region of material to be worked which comprises focussing the beam on the surface to be worked with an intensity sufficiently high to vaporize the material, and continuously deflecting the beam over the surface within the limits of the region of material to be worked in such a manner that the energy concentration is highest along the edge lines of said region and that an amount of energy sufficient for volatilization of the material is fed to each point of said region, in which the beam of charge carriers, in order to produce elongated profiles having non-parallel edges, is guided in longitudinal direction with a speed inversely proportional to the varying profile width and is moved transverse to the longitudinal direction by a deflection magnitude which is amplitude-modulated synchronously to the longitudinal deflection.

20. The method of producing profile millings by means of a beam of charge carriers the working cross section of which is smaller than the surface of the region of material to be worked which comprises focussing the beam on the surface to be worked with an intensity sufficiently high to vaporize the material, and continuously deflecting the beam over the surface within the limits of the region of material to be worked in such a manner that the energy concentration is highest along the edge lines of said region and that an amount of energy sufficient for volatilization of the material is fed to each point of said region, in which the current serving for the transverse deflection of the beam of charge carriers is of sinusoidal, trapezoidal or square course and that its frequency is substantially higher than the frequency of the current serving for the longitudinal deflection.

21. The method of producing profile millings by means of a beam of charge carriers the working cross section of which is smaller than the surface of the region of material to be worked which comprises focussing the beam on the surface to be worked with an intensity sufficiently high to vaporize the material, and continuously deflecting the beam over the surface within the limits of the region of material to be worked in such a manner that the energy concentration is highest along the edge lines of said region and that an amount of energy sufficient for volatilization of the material is fed to each point of said region, in which the beam of charge carriers, for the production of profiles of axial symmetry is deflected in such a manner that it is guided in one direction starting from the center of the overall profile successively over the partial surfaces.

22. In combination, a source of a beam of charge carriers, means for shaping and focussing the beam on the material to be worked, a deflection system designed in accordance with the axial symmetry of the figure to be produced and arranged behind said focussing means and switch means connected with said deflecting system to produce and feed the deflection currents in accordance with a predetermined program, said switch means comprising at least two generators supplying deflection currents of different variations of time and a switching matrix coupled between said generators and said deflection system to feed the deflection currents to coils of the deflection system in accordance with a predetermined program.

References Cited in the file of this patent

UNITED STATES PATENTS 2,989,614     Steigerwald             June 20, 1961

OTHER REFERENCES

Reprint from "American Machinist," issues of Feb. 23, Mar. 9, 1959, entitled "Electron Beam Machining," by Richard T. Berg.